US008814525B2

United States Patent
Petsche et al.

(10) Patent No.: US 8,814,525 B2
(45) Date of Patent: Aug. 26, 2014

(54) PROFILE OF A ROTOR BLADE AND ROTOR BLADE OF A WIND POWER PLANT

(75) Inventors: Marc Petsche, Nubbel (DE); Matthias Korjahn, Bistensee (DE); Bert Gollnick, Rendsburg (DE)

(73) Assignee: Senvion SE, Hamburg (DE)

( * ) Notice: Subject to any disclaimer, the term of this patent is extended or adjusted under 35 U.S.C. 154(b) by 688 days.

(21) Appl. No.: 13/125,322

(22) PCT Filed: Sep. 10, 2009

(86) PCT No.: PCT/EP2009/006574
§ 371 (c)(1),
(2), (4) Date: Jul. 19, 2011

(87) PCT Pub. No.: WO2010/046000
PCT Pub. Date: Apr. 29, 2010

(65) Prior Publication Data
US 2011/0262281 A1    Oct. 27, 2011

(30) Foreign Application Priority Data
Oct. 23, 2008  (DE) .......................... 10 2008 052 858

(51) Int. Cl.
*F01D 5/14*    (2006.01)
*F03D 1/06*    (2006.01)

(52) U.S. Cl.
CPC ............. *F03D 1/0641* (2013.01); *Y02E 10/721* (2013.01); *F05B 2240/301* (2013.01); *Y10S 416/02* (2013.01); *Y10S 416/05* (2013.01)
USPC ................... 416/223 R; 416/243; 416/DIG. 2; 416/DIG. 5

(58) Field of Classification Search
USPC ..................... 416/223 R, 243, DIG. 2, DIG. 5
See application file for complete search history.

(56) References Cited

U.S. PATENT DOCUMENTS

| 3,844,238 A |   | 10/1974 | Murray |
| 3,952,971 A |   | 4/1976  | Whitcomb |
| 4,072,282 A |   | 2/1978  | Fulker et al. |
| 4,240,598 A | * | 12/1980 | Vinas Espin et al. ....... 244/35 R |

(Continued)

FOREIGN PATENT DOCUMENTS

| DE | 2829716 | 1/1979 |
| DE | 3640780 | 10/1988 |

(Continued)

OTHER PUBLICATIONS

Dieter Althaus; Niedriggeschwindigkeitsprofile; 1996, Germany.

(Continued)

*Primary Examiner* — Ned Landrum
*Assistant Examiner* — Justin Seabe
(74) *Attorney, Agent, or Firm* — Rankin, Hill & Clark LLP (57) ABSTRACT

The profile (1-4) of a rotor blade (5) of a wind power plant is characterized in that the main camber line runs beneath the chord at least in sections in the direction of the pressure side (8). The profile is further characterized in that the profile (1-4) has a relative profile thickness of greater than 45% with a position of maximum thickness of less than 50%, wherein a lift coefficient ($c_a$) of greater than 0.9, particularly greater than 1.4 is achieved in turbulent flow.

8 Claims, 6 Drawing Sheets

(56) References Cited

U.S. PATENT DOCUMENTS

| | | | |
|---|---|---|---|
| 4,247,253 A | | 1/1981 | Seki et al. |
| 4,927,331 A | * | 5/1990 | Vuillet .......................... 416/238 |
| 5,474,425 A | * | 12/1995 | Lawlor ..................... 416/223 R |
| 5,562,420 A | | 10/1996 | Tangler et al. |
| 6,705,838 B1 | | 3/2004 | Bak et al. |
| 8,052,394 B2 | * | 11/2011 | Petsche et al. ................ 416/235 |

FOREIGN PATENT DOCUMENTS

| | | |
|---|---|---|
| DE | 19857749 | 6/2000 |
| DE | 10307682 | 1/2004 |
| DE | 102008003411 | 7/2008 |
| EP | 1845258 | 10/2007 |
| GB | 1593329 | 7/1981 |
| GB | 2102505 | 2/1983 |
| GB | 2265672 | 10/1993 |
| WO | WO 2007118581 A1 * | 10/2007 |
| WO | 2009/068719 | 6/2009 |

OTHER PUBLICATIONS

Eric Hau; Wind Turbines, Fundamentals, Technologies, Application, Economics; Germany.

Peter Fuglsang, et al.; Development of the Riso Wind Turbine Airfoils; Wind Energy, 2004.

Desktop Aeronautics, Inc.; Applied Aerodynamics: A Digital Textbook, Version 5.0, Jan. 2007, Stanford CA.

Peter Fuglsang; Aeroelastic blade design, Riso National Lab.; Roskilde, Denmark.

Peter Fuglsang, et al.; Wind Tunnel Tests of Riso-B1-18 and Riso-B1-24; Riso National Laboratory, Roskilde, Denmark, Jan. 2003.

Eastman N. Jacobs, et al.; The Characteristics of 78 Related Airfoil Sections from Tests in the Variable-Density Wind Tunnel, NACA Report No. 460; 1933.

K.J. Standish, et al.; Aerodynamic Analysis of Blunt Trailing Edge Airfoils; vol. 125, Nov. 2003.

Fuglsang, et al. II, "Wind Tunnel Test of Riso-B1-18 and Riso-B1-24", Riso National Lab., Roskilde, DK, Jan. 2003.

K.J. Standish "Aerodynamic Analysis of Blunt Trailing Edge Airfoils" Journal of Solar Energy Engineering, Nov. 2003, vol. 125/479.

Fuglsang et al III, "Development of the Riso Wind Turbine Airfoils", Copyright 2004 John Wiley & Sons Ltd.

Dieter, Althaus; Niedriggeschwindigkeitsprofile; Germany, 1996, 591 pages. ISBN 3-528-03830-9.

SAND 2004-0074, "Innovative Design Approaches for Large Wind Turbine Blades Final Report", Unlimited Release, Printed May 2004.

SAND 2002-2519, "Parametric Study for Large Wind Turbine Blades", Unlimited Release, Printed Aug. 2002, WindPACT Blade System Design Studies.

C.P. Van Dam; "Airfoils for Structures—Passive and Active Load Control for Wind Turbine Blades" Department of Mechanical & Aeronautical Engineering, University of California, Davis, 2004.

C.P. Case Van Dam, et al; "Computational Design and Analysis of Flatback Airfoil Wind Tunnel Experiment", SAND 2008-1782, Unlimited Release, Printed Mar. 2008.

Jonathan P. Baker, et al; "Flatback Airfoil Wind Tunnel Experiment", Unlimited Release, printed Apr. 2008, SAND2008-2008.

Berg, Dale E., et al; "Aerodynamic and Aeroacoustic Properties of Flatback Airfoils", ASME Wind Energy Symposium, Jan. 9, 2008.

D.J. Malcolm; "WindPACT Turbine Rotor Design Study", Jun. 2000-Jun. 2002.

J.L. Tangler, et al; "NREL Airfoil Families for HAWTs", Colorado, updated AWEA 1995.doc.

J.L. Tangler, et al; "NREL Airfoil Families for HAWTs", Colorado, Jan. 1995.

* cited by examiner

PROFILE OF A ROTOR BLADE AND ROTOR BLADE OF A WIND POWER PLANT

BACKGROUND OF THE INVENTION

1. Field of the Invention

The invention relates to a profile of a rotor blade of a wind power plant, a plurality of such profiles and a corresponding rotor blade of a wind power plant.

2. Description of Related Art

The document DE 10 2008 003 411 A1 discloses a corresponding profile of a rotor blade of a wind power plant and a corresponding family or a plurality of profiles. The airfoils, or respectively profiles, disclosed in this document have an obtuse trailing edge, a substantially oval suction side, and a substantially S-shaped pressure side.

Further profiles are also known. In particular, low speed profiles are also known which are used in the proximity of the blade root, or in the proximity of the hub, of a wind power plant.

From "Niedriggeschwindigkeitsprofile" ("Low Speed Profiles") by Dieter Althaus, Friedrich Vieweg & Sohn Verlagsgesellschaft mbH, Brauschweig/Wiesbaden, Germany, 1996, a known profile having lower relative thickness is produced in that a known profile is attained by cutting the trailing edge or scaling up the thickness to the required relative thickness values, which is necessary in the proximity of the blade root. The FX 77-W-500, shown on pages 162 and 163 in this book, can be cited as an example of this. This profile attains a maximum lift coefficient of $c_a=1.6$ at an angle of attack of 10° in the clean state at a Reynold's number of 2.75 million, and in the unclean, thus turbulent, state attains a maximum $c_a$ of 0.8 at an angle of attack of 4°. The FX 77-W-500 has a relative profile thickness of 50%.

The angle of attack or angle of incidence is understood within the context of the invention to be an angle of the incoming apparent wind with respect to the chord of the profile. The textbook "Windkraftanlagen" ("Wind Turbines") by Erich Hau, 4th Edition, 2008, particularly pages 126 ff, is referenced for any definitions.

Known profiles having a high relative profile thickness, for instance FX 77-W-500, have, in the clean state, an acceptable lift coefficient $c_a$, however the maximum lift coefficient drops significantly during turbulent flows, that is in the unclean state. Also, the aerodynamic angle of attack, at which the maximum lift coefficient is attained in the unclean state, changes significantly. This behavior, namely the low lift in the case of fouling with a large change in the angle of attack for the maximum lift coefficient is very disadvantageous for wind power plants. If the angle used in the design of the rotor blade with the calculation of the respective profile is the angle, or a slightly smaller angle, at which the clean profile has the maximum lift coefficient, is selected as a design angle of attack, thus the angle of attack, which is expedient, as the blade depths should be kept low, then the lift coefficient in the unclean state reduces to a fraction of the clean value. The profile of the FX 83-W-500, due to the thick trailing edge, has already only moderate aerodynamic properties during laminar flow. With turbulent flow, it still has a high lift coefficient, but then has relatively poor drag ratios. Furthermore, the maximum thickness of this profile occurs at approximately 80% of the profile length or chord length, which is structurally less beneficial for a good body contour of the rotor blade. Thus, with a blade having the profile of the FX 83-W-500 only a relatively small distance of the main belts can be produced which causes corresponding disadvantages with the constructibility and the blade weight of a rotor blade.

BRIEF SUMMARY OF THE INVENTION

The object of the present invention is to specify a profile of a rotor blade of a wind power plant and correspondingly a plurality of profiles and a corresponding rotor blade that attains good aerodynamic properties both with laminar as well as with turbulent flows. In the process, the blade weight, in particular, should be minimized.

This objective is achieved by a profile of a rotor blade of a wind power plant with an upper side (suction side) and a lower side (pressure side) having a main camber line and a chord between the leading edge and the trailing edge of the profile, wherein the main camber line runs at least in sections below the chord in the direction of the pressure side.

Using this measure with the profile according to the invention, a high angle of attack can be selected, wherein a high lift coefficient and a high drag ratio can be attained. Through this, the twisting of a rotor blade provided with such a profile, or respectively a rotor blade provided with a family or a plurality of profiles can be kept low so that the largest possible distance of the main belts can be attained without torsion of the main belts, and thus, the rotor blade weight is reduced.

Preferably, the camber line is disposed below the chord at a distance between 0% to 60%, particularly 0% to 50%, of the profile depth. With this, a profile for a wind power plant having very good aerodynamic properties is possible.

If the camber line is preferably completely disposed in a section between 5% to 50%, particularly 2% to 60%, beneath the chord, the design of the profile is relatively problem-free even at lower Reynold's numbers.

Preferably, the value of the maximum camber is less than 0.015. Here, the camber is the distance of the camber line to the chord in percent of the chord length. The maximum camber for the given profile is therefore the largest distance of the main camber line to the chord in percent of the chord length. The main camber line, in the context of the invention, is the line of the midpoints of the circles inscribed between the upper side of the profile and the lower side of the profile. The chord, in the context of the invention, is defined as the line from the middle of the trailing edge of the profile to the farthest removed point of the profile, which corresponds to the nose point. The curvature of the main camber line, in the context of the invention, is defined as the second derivative of the function of the main camber line. The maximum profile thickness, in the context of the invention, also called the relative profile thickness, is the maximum thickness of a profile perpendicular to the chord related to the chord length. The position of maximum thickness, in the context of the invention, is defined as the distance of maximum profile thickness from the leading nose point related to the length of the chord, given in percent. The trailing edge thickness, in the context of the invention, is defined as the thickness of the trailing edge relative to the length of the chord.

Preferably, the second derivative of the main camber line (curvature of the main camber line) is either 0 or positive from 10% to 40%, particularly from 5% to 50%, particularly from 2% to 60%, of the profile thickness. This profile also has its own inventive subject matter.

A profile according to the invention has particularly good aerodynamic properties if the profile has a relative profile thickness of greater than 49%, particularly greater than 55% or equal to 55%, wherein the distance of the blade nose in relation to the greatest profile thickness is less than 35%. This profile, which has its own inventive subject matter, is particularly suited for profiles at the rotor blade root side.

An inventive and preferred profile, which has its own inventive subject matter, is characterized in that the profile has a relative profile thickness of greater than 45%, particularly greater than 50% or equal to 50%, wherein a drag ratio of greater than 6, particularly greater than 10, particularly greater than 15, is attained with turbulent flows. Using this profile in the region of the rotor blade near the blade root, the energy contained in the incident flow is efficiently exploited despite the high relative profile thickness of greater than 45%, even without extreme blade depth. This effect is also attained to the greatest extent possible with unclean profiles, thus in the case of completely turbulent flow of the profiles. Furthermore, the aforementioned profiles and also the following profiles have been developed further in that the working region lies at large aerodynamic angles of attack, for example >10°. As a result, a production-related disadvantageous high geometric blade twisting is avoided. Preferably, the relative thickness is greater than 65%, particularly greater than or equal to 70%.

A particularly preferred profile of a rotor blade of a wind power plant that has its own inventive subject matter, is characterized in that the profile has a relative profile thickness of greater than 45%, with a distance of the blade nose in relation to the greatest profile thickness of less than 50%, wherein a lift coefficient of greater than 0.9, particularly greater than 1.4, is achieved with turbulent flow.

Preferably, the relative profile thickness is greater than 65%, particularly greater than or equal to 70%. The lift coefficients are attained preferably with design angles of incident flow or respectively angles of attack from 6° to 15°, particularly 8° to 14°.

A further preferred profile that has its own inventive subject matter, provides a nose radius that is greater than 18% of the profile depth, wherein the profile is asymmetrical in the nose region.

Preferably, a ratio of the maximum lift coefficient with turbulent flow to the maximum lift coefficient with laminar flow is greater than 0.75.

Preferably, the suction side and the pressure side of the profile each have in the trailing region a concave contour, at least in sections. Due to this, significantly smaller overspeeds take place on the suction side, while a significant portion of the total lift of the profile is generated on the pressure side, by a so-called "rear loading".

Preferably, a plurality of profiles according to the invention is provided that is implemented in at least one region of a rotor blade of a wind power plant.

In addition, a rotor blade of a wind power plant is preferably provided with a plurality of profiles according to the invention. In particular preferably, a plurality of profiles is disposed in a transition region of the rotor blade in the proximity of the blade root.

In the context of the invention, a turbulent flow or profile circulation is then considered as present when the aerodynamically cleanly defined transition of the flow from laminar to turbulent is present. A turbulent flow, in the context of the invention, is in particular a flow condition, at which more than 90%, particularly more than 92% of the surface has a turbulent boundary layer. In testing, and also with the measurements presented in the following, this is simulated through roughnesses that are just large enough to bring about a transition layer from a laminar boundary layer to a turbulent boundary layer. For this purpose, a steel band, for example, is implemented on the suction side at 5% from the nose point, and on the pressure side at 10% from the nose point, sometimes also at 5% (suction side) and 5% (pressure side) or 3%/5%, or 3%/3%. In this context, the exact location of the steel band depends on the nose radius and the angle of attack to be measured.

An advantage of the profiles according to the invention lies in the high lift coefficients, in both the clean as well as in the unclean state, thus, with laminar as well as with turbulent flow. A further advantage lies in that the operating points of the profiles according to the invention are located at high aerodynamic angles of attack, whereby the geometric twisting of the entire rotor blade can be significantly reduced, which is a great advantage in the production and also leads to lower rotor blade weights. It is also possible that the maximum blade twisting is fixed by production techniques so that with the profiles according to the invention in the proximity of the blade root, it is attained that these can still be used at the optimal operating point, which is not possible in the rotor blade root region with the rotor blades known so far. Thus, with the profiles according to the invention, angles of attack can prevail with known profiles in the blade tip, with which an optimal lift is generated, and simultaneously other angles of attack can prevail in the proximity of the blade root which for the profiles there still generates an optimal or at least still acceptable lift.

A further advantage lies in that the distance of the blade nose in relation to the greatest profile thickness is exactly designed for a good body contour within the rotor blade. This makes possible a maximum main belt distance in the region of relative profile thicknesses of 35% up to the cylinder (at the rotor blade root) with the lowest possible curvatures in the nose edge belt and trailing edge belt.

The maximum profile thickness being comparatively far forward and/or the relatively large nose radius are particularly advantageous.

All aforementioned features, including those taken from the drawings alone, and individual features, which are disclosed in combination with other features, are considered individually and in combination as important to the invention.

BRIEF DESCRIPTION OF THE DRAWINGS

The invention is described below, without restricting the general idea of the invention, using exemplary embodiments with reference to the drawings, whereby we expressly refer to the drawings with regard to the disclosure of all details according to the invention that are not explained in greater detail in the text. The drawings show.

DETAILED DESCRIPTION OF THE INVENTION

In the following figures, the same or similar types of elements or corresponding parts are provided with the same reference numbers so that a corresponding re-introduction can be omitted.

Figure 1:
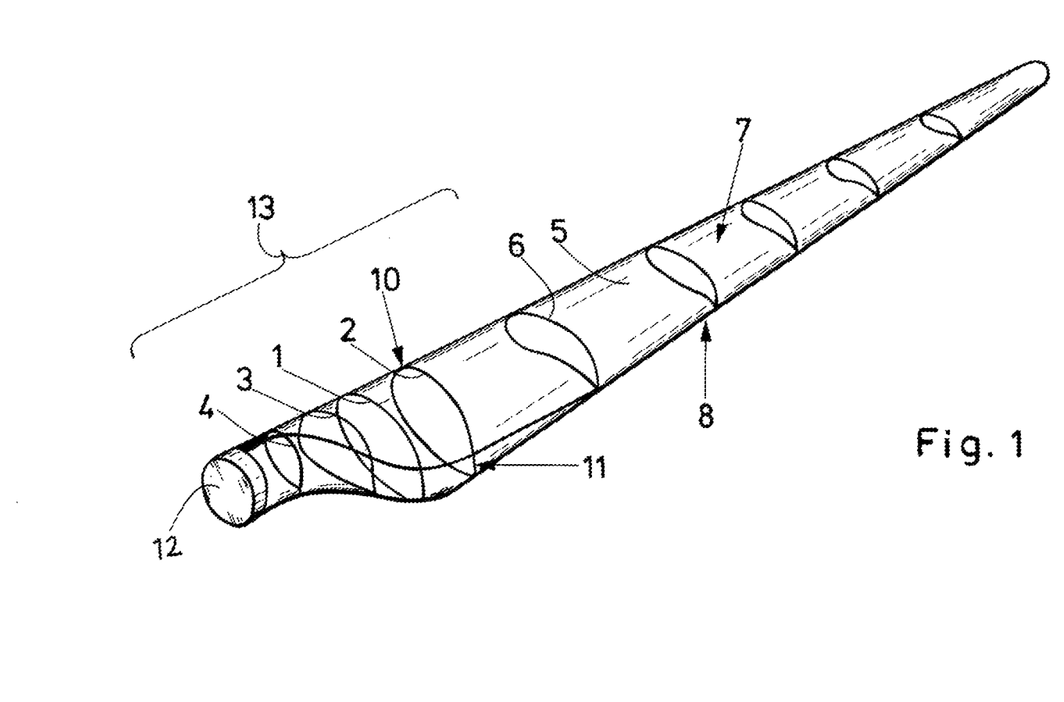
FIG. 1 a schematic representation of a rotor blade having inscribed profiles, FIG. 2 a profile according to the invention in comparison to a profile of the prior art, FIG. 3 a further profile according to the invention in comparison to a further profile of the prior art, FIG. 4 a profile of the prior art in comparison to three profiles according to the invention, FIG. 5 a schematic diagram concerning calculated profile polars of a profile according to the invention, FIG. 6 a schematic diagram concerning calculated profile polars of a profile of the prior art, FIG. 7 a schematic diagram of measured profile polars of a profile according to the invention, and FIG. 8 a schematic diagram of a measured profile polars of a profile of the prior art.

FIG. 1 shows a schematic representation of a rotor blade 5 of a wind power plant, not shown, wherein a few profiles 1-4 and 6 are already marked schematically.

Profiles 1-4 according to the invention are provided in a transition region 13 in the proximity of a rotor blade root 12. The transition region 13 can be distinguished, for example, in that the trailing edge 11 no longer ends acute as with the further profiles 6, rather it is designed obtuse, and for example, the more obtuse the closer profile is to the rotor blade root 12. For improved visualization, the leading edge 10 is also indicated, as well as an upper side or suction side 7 and a lower side or pressure side 8. In the context of the invention, the profiles 1-4 that are located in the transition region 13 are of particular interest. These profiles 1-4 are now described in more detail.

Figure 2:
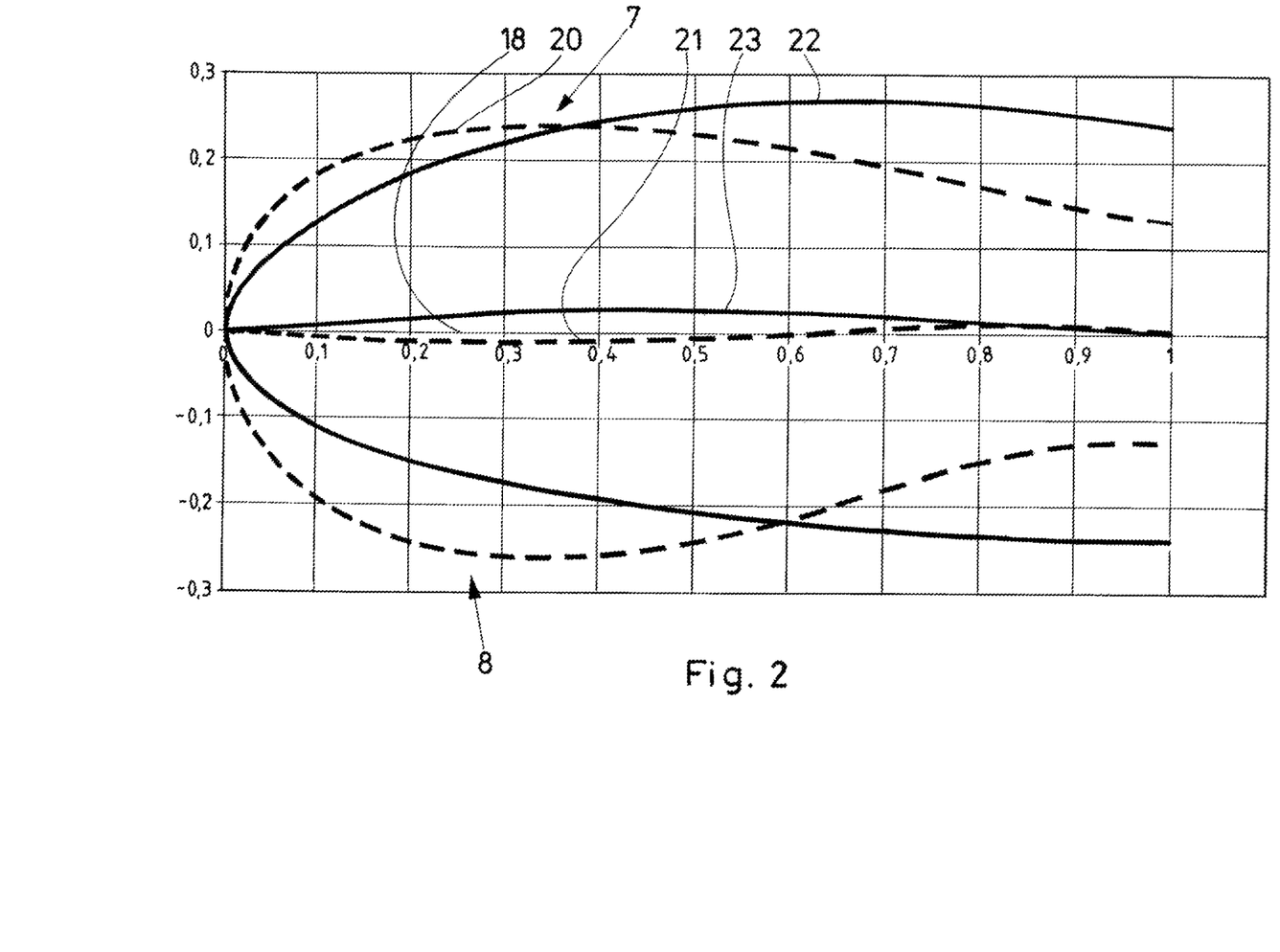

FIG. 2 shows a profile according to the invention in comparison to a profile of the prior art. The profile 20 according to the invention that has the designation RE-W-50-B6, has in the leading profile region up to 60% or 0.6 of the chord length, a camber line 21 curved toward the pressure side 8. Only at approximately 0.63 of the chord length, the camber line 21 crosses the chord 18 and proceeds in the direction of the suction side 7. Furthermore, in comparison to the profile FX 83-W-500 (see Althaus, from the citation above, pages 552, 553), labeled with the reference number 22, the maximum profile thickness is located relatively far forward. With the profile 20, the maximum profile thickness is at 34.4% or 0.344 of the profile depth or chord length. The known profiles that are named in the document by Althaus, cited above, have a position of maximum thickness of 37.5% up to 78.7%.

Also, the nose radius of the profile 20, with 23.3% of the profile depth is significantly larger than the comparative profile with values between 5.6% to 14.8%, where it must be considered here that the profile is also asymmetrical in the nose region. The comparative profile 22, that is, the FX 83-W-500, also has a camber line 23, which is disposed completely above the chord 18 toward the suction side 7. The relative profile thickness of the profile 22 is at 50%. This lies at a profile depth of 78.7%. There is a maximum camber of 0.02539 at a profile depth of 52.7%. The nose radius is 0.056 or respectively 5.6%. The profile has a cross-sectional area of 0.4134 and a trailing edge thickness of 0.479% or respectively 47.9%. The profile 20 according to the invention has a relative profile thickness of 50% at a profile depth of 34.4% and a maximum camber of 0.0123. The maximum camber is present at a profile depth of 82.5%. The nose radius is 23.3%, the profile cross-sectional area is 0.3927, and the trailing edge thickness is at 25.7%. It can be recognized that a concave contour of the profile is given, particularly, on the pressure side 8 in the trailing region of the profile. This is also given on the suction side 7, however, not formed as strongly and prominently as on the pressure side 8. The contour of the profile 22 according to the prior art is, in contrast, convex in the trailing region.

FIG. 3 again shows a further profile according to the invention, namely the RE-W-70-B9 profile, represented in comparison to a profile of the prior art, namely the FX 79-W-660A profile. The associated camber lines 25 and 27 are also represented. In this case too, the camber line 25 of the RE-W-70-B9 is disposed beneath the chord 18 toward the pressure side 8, and the camber line 27 of the FX 79-W-660A of the prior art is disposed above the chord 18 toward the suction side 7. The profile 24 according to the invention has a relative profile thickness of 70% with a profile depth of 47.7%. A minimal camber or respectively maximum camber by amount, from −0.014 at a profile depth of 39.9% is forseen. The maximum positive camber amounts to 0.0118 at 85% profile depth. The nose radius is 23.87%.

Figure 3:
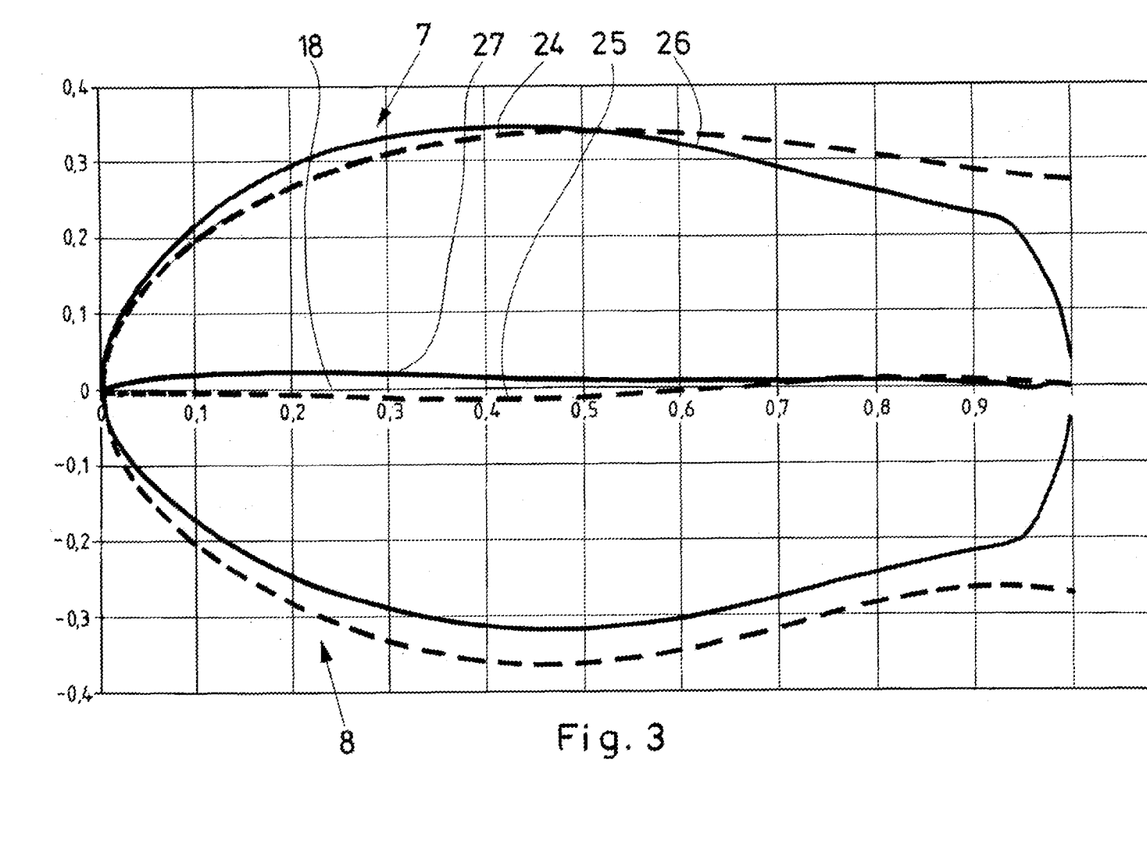

The profile 26 according to the prior art has a relative profile thickness of 66.4% at a profile depth of 46.7%. A maximum camber of 2.2% is present at a profile depth of 17.1%. The nose radius is 4.1%.

Figure 4:
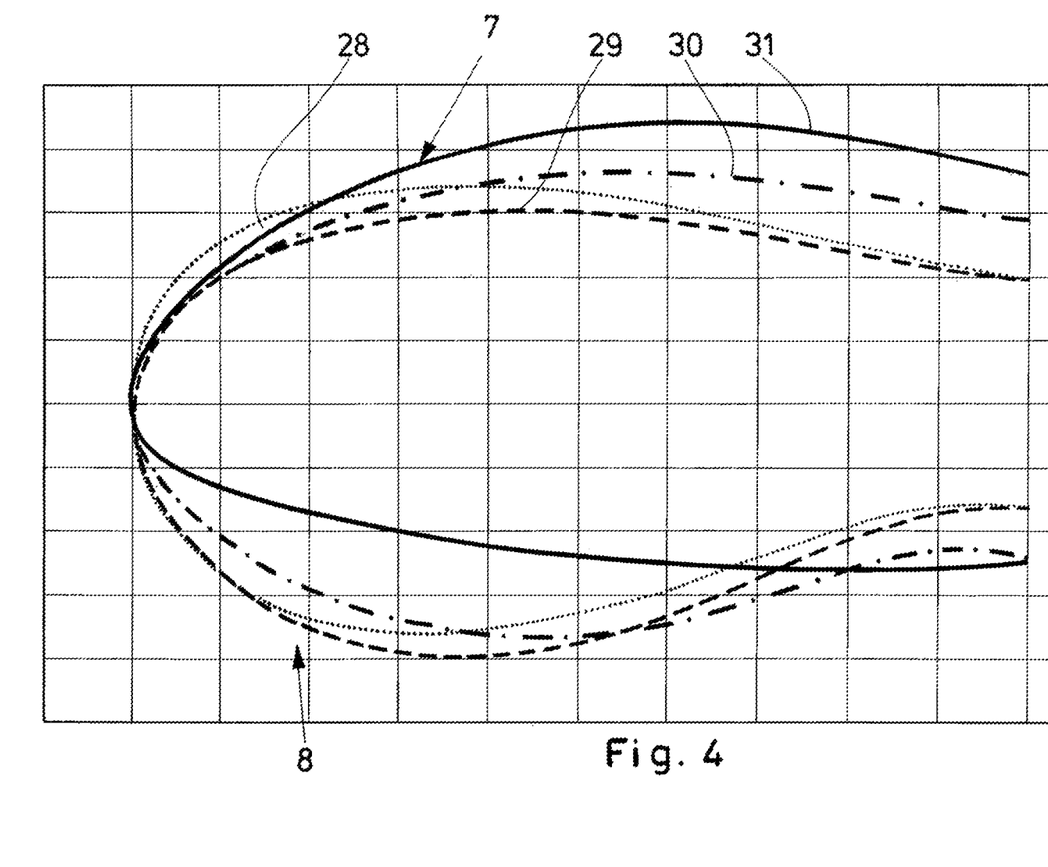

FIG. 4 shows four further profiles of a rotor blade 5 of a wind power plant, wherein the profiles 28, 29, and 30 are profiles according to the invention and one profile, namely profile 31, is a profile of the prior art.

The profile 31 corresponds to the FX 77-W-700 from the prior art. This can be implemented based on the document "Niedrig-geschwindigkeitsprofile" ("Low Speed Profiles") cited above, by Dieter Althaus, so that the profile FX 77-W-500, that is specified on pages 162 and 163, for example, is cut off further back, and in such a manner that a relative thickness or relative profile thickness of 70% results. Naturally, this thickness is present then with a profile depth lying relative far back, in this case, at approximately 68%.

The profiles according to the invention 28 corresponding to the RE-W-70-A1, 29 corresponding to the RE-W-70-A2 and 30 corresponding to the RE-W-70-B1, also have a relative profile thickness of 70% with a distance of the blade nose in relation to the greatest profile thickness of approximately 34% for the profile 28, approximately 37% for the profile 29, and approximately 50% for the profile 30. Here also, it is evident with the profiles 28 to 30 according to the invention that they have concave contours towards the trailing edge of the profile that are particularly strongly formed on the pressure side 8.

Figure 5:
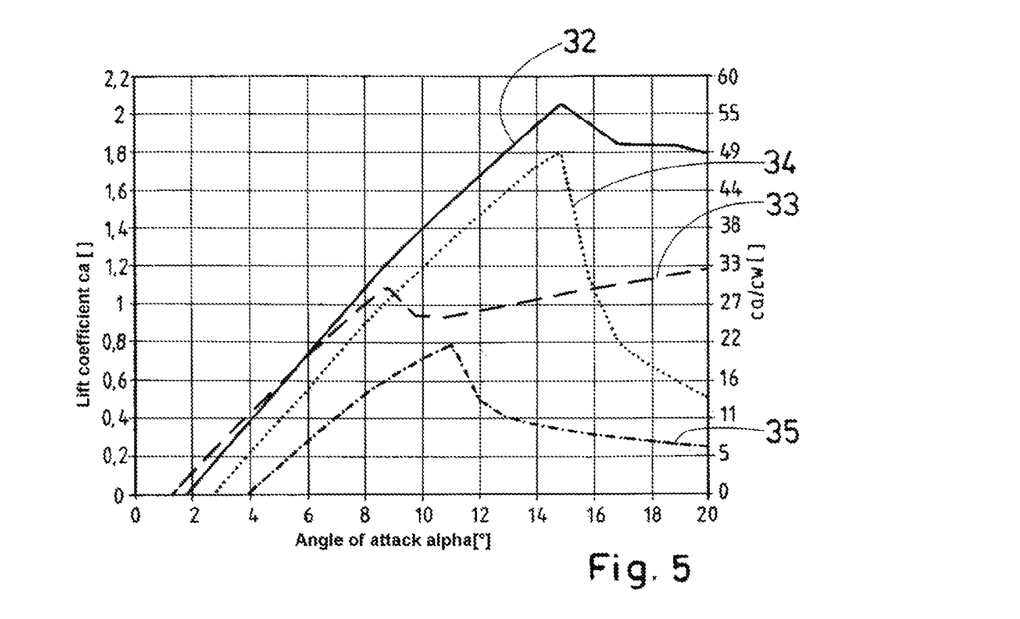

FIG. 5 shows a schematic diagram concerning calculated profile polars of a profile according to the invention, namely RE-W-70-B9. It shows the lift coefficient $c_a$ over the angle of attack α (alpha), and the ratio of the lift coefficient to the drag coefficient $c_w$. This ratio is the drag ratio. The polars in FIG. 5 are a calculation of the profile polars for a Reynold's number of 3 million. Corresponding calculations were performed for turbulent flow and laminar flow. The profile polar 32 represents a calculation of the lift coefficient $c_a$ with laminar flow and the profile polar 33 represents the corresponding value with turbulent flow. The profile polar for the drag ratio for laminar flow is shown with the reference number 34, and correspondingly for turbulent flow with the reference number 35. It can be seen that the lift coefficient has a maximum at an angle of attack of approximately 14.8°, specifically with laminar flow, and for turbulent flow, the maximum is at an angle of attack of approximately 9°. The drag ratio also has a maximum at approximately 14.8° with a laminar flow, and at approximately 11° with a turbulent flow.

Figure 6:
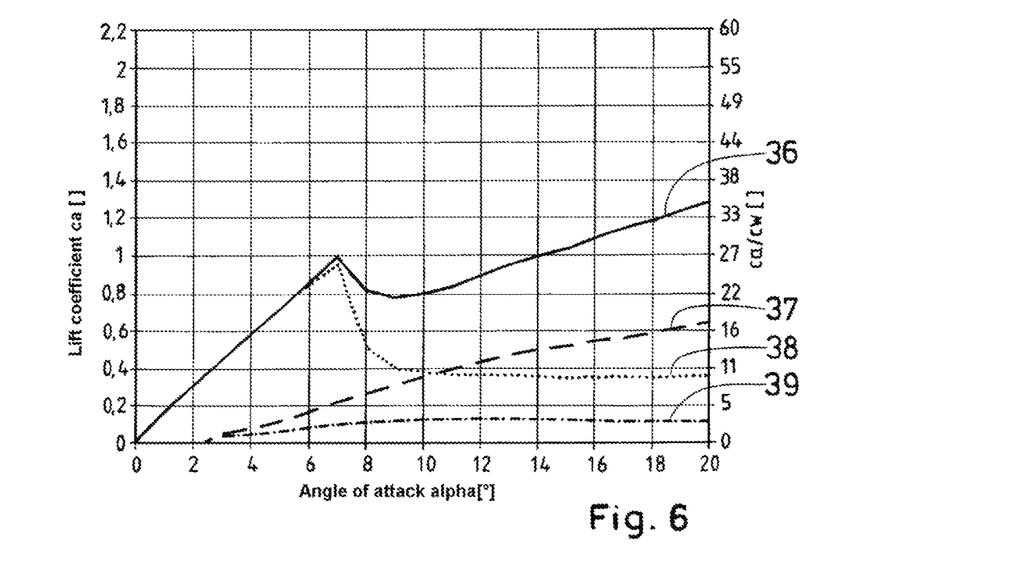

In comparison to the corresponding profile polars of an inventive profile according to FIG. 5, the corresponding profile polars 36, 37, 38 and 39 of a known profile, namely FW 79-W-660 A, are given in FIG. 6. It is particularly apparent with the profile polar 36 that a local maximum of the lift coefficient with a laminar flow is given at approximately 7°, and with one profile polar relating to the drag ratio with laminar flow, which is provided with the reference number 38, a corresponding maximum is present at an angle of attack α of 7°.

It can be seen clearly with profile polar 37 that also relates to the lift coefficient $c_a$ that the lift is significantly minimized. The same applies for the profile polar 39 relating to the drag ratio with turbulent flow.

Figure 7:
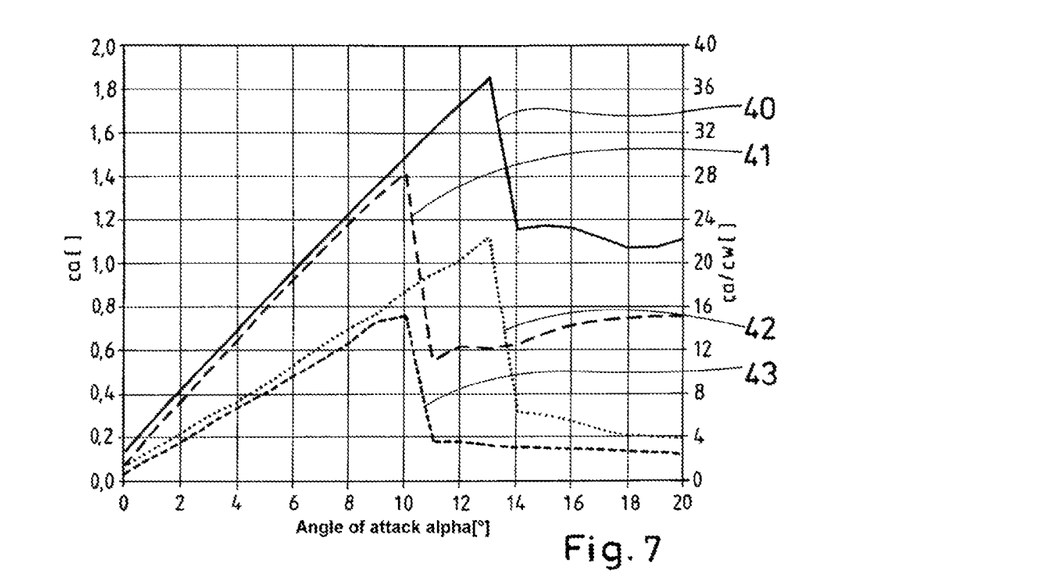

FIG. 7 shows a schematic diagram of measured profile polars of a profile according to the invention, namely the RE-W-50-B6 profile that was already represented in FIG. 2. The profile polar 40 shows the lift coefficient with laminar flow with a Reynold's number of 3 million. It attains a maximum lift coefficient of approximately 1.84 at an angle of approximately 13°.

It can be clearly seen that even with turbulent flow according to the profile polar 41, that the lift coefficient is only slightly reduced. It has a maximum of 1.4 at an angle of attack, or incident angle α of approximately 10°. The Reynold's number here during the measurement amounted to 3.1 million. The profile polar 42 concerning the drag ratio ($c_a/c_w$) with laminar flow has a maximum at an angle of attack of approximately 13°. The quotient here is approximately 22. According to the profile polar 43, with turbulent flow, the maximum drag ratio is reduced to 15.5 at an angle of attack of approximately 10°.

Figure 8:
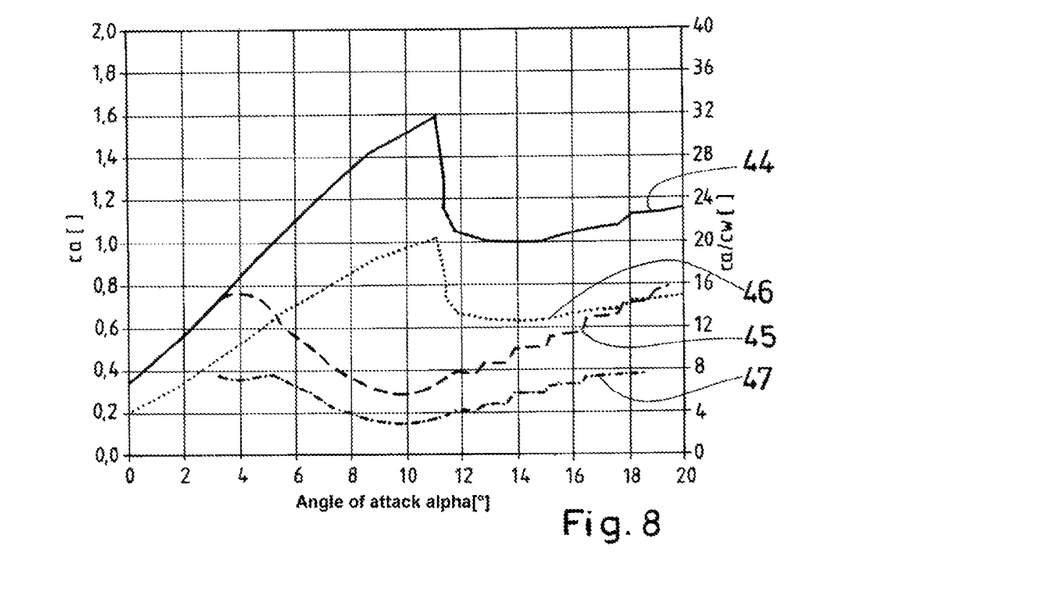

For comparison, a corresponding schematic diagram in FIG. 8 shows the measured profile polars of a profile of the prior art, namely the FX 77-W-500 profile. In comparison to the profile polar of the lift coefficients $c_a$ 44 with laminar flow and the profile polar 46 concerning the drag ratio with laminar flow, which already have inferior values than those according to the invention with laminar flow, the profile polars completely break down with turbulent flow. Thus, here too, the measured profile polar for the lift coefficient $c_a$ with turbulent flow is marked with 45 and the corresponding measured profile polar 47 concerning the drag ratio is also shown for the turbulent flow.

LIST OF REFERENCE SYMBOLS 1-4 Profile
5 Rotor blade
6 Profile
7 Suction side
8 Pressure side
10 Leading edge
11 Trailing edge
12 Blade root
13 Transition region
18 Chord
20 Profile RE-W-50-B6
21 Camber line of the RE-W-50-B6
22 Profile FX 83-W-500
23 Camber line of the FX 83-W-500
24 Profile RE-W-70-B9
25 Camber line of the RE-W-70-B9
26 Profile FX 79-W-660 A
27 Camber line of the FX 79-W-660A
28 Profile RE-W-70-A1
29 Profile RE-W-70-A2
30 Profile RE-W-70-B1
31 Profile FX 77-W-700
32 Profile polar $c_a$ laminar
33 Profile polar $c_a$ turbulent
34 Profile polar $c_a/c_w$ laminar
35 Profile polar $c_a/c$, turbulent
36 Profile polar $c_a$ laminar
37 Profile polar $c_a$ turbulent
38 Profile polar $c_a/c$, laminar
39 Profile polar $c_a/c$, turbulent
40 Profile polar $c_a$ laminar
41 Profile polar $c_a$ turbulent
42 Profile polar $c_a/c$, laminar
43 Profile polar $c_a/c$, turbulent
44 Profile polar $c_a$ laminar
45 Profile polar $c_a$ turbulent
46 Profile polar $c_a/c$, laminar
47 Profile polar $c_a/c$, turbulent

The invention claimed is:

1. Profile (1-4) of a rotor blade (5) of a wind power plant, the rotor blade comprising:
    an upper side (suction side) (7), and
    a lower side (pressure side) (8) with a main camber line (21, 25) and a chord (18) between a leading edge (10) and a trailing edge (11) of the profile (1-4),
    wherein the main camber line (21, 25) runs beneath the chord (18) at least in sections in a direction of the pressure side (8),
    wherein the profile (1-4) has a relative profile thickness of greater than or equal to 55% of a length of the chord (18),
    wherein a position of maximum thickness is at less than 35% of the length of the chord (18) from a nose of the rotor blade, wherein the main camber line (21, 25) is disposed completely beneath the chord (18) in a section between 2% to 60% of the profile depth of the profile (1-4).

2. Profile (1-4) according to claim 1, wherein a maximum camber is defined as a distance of the main camber line (21, 25) to the chord (18) in percentage of the chord length, and wherein a value of the maximum camber is less than 0.015.

3. Profile (1-4) according to claim 1, wherein the second derivative of the camber line (21, 25) (curvature of the camber line) is either 0 or positive from 2% to 60%, of the profile depth.

4. Profile (1-4) according to claim 1, wherein the relative profile thickness is greater than or equal to 70%.

5. Profile (1-4) according to claim 1, wherein the suction side (7) and the pressure side (8) of the profile (1-4) have a concave contour in the trailing region, at least in sections.

6. Plurality of profiles (1-4) according to claim 1, wherein that are implemented in at least one region of a rotor blade (5) of a wind power plant.

7. Rotor blade (5) of a wind power plant having a plurality of profiles (1-4) according to claim 6.

8. Rotor blade (5) according to claim 7, wherein the plurality of profiles (1-4) is disposed in a transition region (13) of the rotor blade (5) in the proximity of the blade root (12).

* * * * *